US012649118B2

(12) United States Patent
Brown

(10) Patent No.: US 12,649,118 B2
(45) Date of Patent: Jun. 9, 2026

(54) SELF-CLEANING INTAKE FILTER

(71) Applicant: WAIRERE RESEARCH LIMITED, Christchurch (NZ)

(72) Inventor: Peter Derek Brown, Christchurch (NZ)

(73) Assignee: WAIRERE RESEARCH LIMITED, Christchurch (NZ)

( * ) Notice: Subject to any disclaimer, the term of this patent is extended or adjusted under 35 U.S.C. 154(b) by 507 days.

(21) Appl. No.: 18/132,398

(22) Filed: Apr. 9, 2023

(65) Prior Publication Data

US 2023/0330572 A1     Oct. 19, 2023

(30) Foreign Application Priority Data

Apr. 19, 2022     (NZ) ........................................ 787348

(51) Int. Cl.
| | |
|---|---|
| *B01D 33/46* | (2006.01) |
| *B01D 33/067* | (2006.01) |
| *B01D 33/073* | (2006.01) |
| *B01D 33/80* | (2006.01) |
| *B01D 39/12* | (2006.01) |

(52) U.S. Cl.
CPC ......... *B01D 33/461* (2013.01); *B01D 33/067* (2013.01); *B01D 33/073* (2013.01); *B01D 33/801* (2013.01); *B01D 39/12* (2013.01); *B01D 2201/282* (2013.01); *B01D 2201/342* (2013.01)

(58) Field of Classification Search
CPC .. B01D 33/461; B01D 33/067; B01D 33/073; B01D 33/801; B01D 39/12; B01D 2201/282; B01D 2201/342
See application file for complete search history.

(56) References Cited

U.S. PATENT DOCUMENTS

| | | | |
|---|---|---|---|
| 4,822,486 A | 4/1989 | Wilkins et al. | |
| 2007/0090041 A1 | 4/2007 | Berry, III et al. | |
| 2011/0133132 A1 | 6/2011 | Zhamu et al. | |
| 2015/0114901 A1* | 4/2015 | Maupin .................. | B01D 33/11 |
| | | | 210/330 |

FOREIGN PATENT DOCUMENTS

| | | |
|---|---|---|
| CN | 207384968 U | 5/2018 |
| CN | 215195739 U | 12/2021 |
| WO | 2015106221 A1 | 7/2015 |
| WO | 2020228860 A2 | 11/2020 |

OTHER PUBLICATIONS

CN107569899 Hu et al.—High flow ceramic filter element (Abstract & MT, Jan. 12, 2018) (Year: 2018).*

* cited by examiner

*Primary Examiner* — Hayden Brewster
(74) *Attorney, Agent, or Firm* — SALIWANCHIK, LLOYD & EISENSCHENK

(57) ABSTRACT

An intake filter including a cylindrical screen assembly and a drive unit; where the drive unit is attached to the intake filter and configured to rotate the screen assembly about a longitudinal axis of said screen assembly, such that the drive unit lies entirely outside the volume of the screen assembly.

25 Claims, 6 Drawing Sheets

SELF-CLEANING INTAKE FILTER

CROSS-REFERENCE TO A RELATED APPLICATION

This application claims priority to New Zealand Patent Application No. 787348, filed Apr. 19, 2022, and New Zealand Application No. 790972, filed Aug. 3, 2022, both of which are incorporated herein by reference in their entirety.

TECHNICAL FIELD

The present invention relates to an intake screen used to exclude debris and fish from entering a water inlet. In particular a self-cleaning rotating wire screen where the self-cleaning action uses an external brush.

BACKGROUND ART

Water inlets use a filter to prevent debris and fish from entering an intake or pipework. These filters most commonly use a filter screen such as a filter wire (such as wedge wire), a mesh, or perforated sheet, often metal. In many environments these filter screens can be prone to blocking without some self-cleaning mechanism. Common cleaning mechanisms include backwash water jets (internal or external), air bursts, brushes and/or scrapers.

Scrapers normally remove only material on the surface of the filter screen thus are normally augmented by additional cleaning mechanisms which increases the cost.

Brush cleaning the filter screen is significantly more energy efficient and, in conjunction with a wire filter, is generally more effective at removing algal growth than water jets or air burst systems. However, to ensure the entire wire filter is cleaned brush systems used for this purpose normally include a mechanism for driving a rotating cylindrical drum which includes the wire filter. It is normal to drive this drum with an internal drive unit aligned with the central rotating axis of the drum, see for example U.S. Pat. No. 7,347,933. However, this approach has three key drawbacks:

(1) it requires a large amount of torque to drive the drum;
(2) accessing the drive unit for servicing or repairs is more difficult, thus often expensive, because it is situated inside the rotating drum; and
(3) the brush for cleaning the drum can only be fixed at one end as the other end is rotated by the internal drive unit.

A brush system that is fixed only at one end can limit the brush cleaning effectiveness as the brush is cantilevered. An external cantilevered brush tends to result in bristles that brush the wire filter surface, without forcing the bristles deep into the wire filter slots. The lack of slot penetration means a second internal brush is normally required to clean the inside of the filter wires. The requirement for a second internal brush increases the cost and eventually the second brush will need replacing which can involve disassembly of the filter.

Any discussion of the prior art throughout the specification is not an admission that such prior art is widely known or forms part of the common general knowledge in the field.

The present invention provides a self-cleaning filter screen which includes a brush and/or externally mounted drive unit that ameliorates one or more deficiencies of current systems, or provides the customer with a useful choice.

DISCLOSURE OF INVENTION

The present invention provides an intake filter including a cylindrical screen assembly, a core assembly and a drive unit; where the drive unit is attached to the intake filter and configured to rotate the screen assembly about a longitudinal axis of said screen assembly, such that the drive unit lies entirely outside the volume of the screen assembly and a portion of the core assembly lies within the volume of the screen assembly.

Preferably the screen assembly includes a filter screen including at least one wire that extends circumferentially about the filter screen. In a highly preferred form at least one of the at least one wire is a wedge wire. In one preferred form there are a plurality of wires that extend circumferentially about the filter screen. Preferably at least one of the at least one wire follows a helical path. Preferably at least one of the at least one wire extends helically the entire length of the filter screen. In an alternative form at least one wire extends helically along only a portion of the filter screen.

In a preferred form the intake filter includes a removable non-rotating end seal releasably attached to one terminal end of the intake filter, a first end, and a screen stop located adjacent the opposite terminal end of the intake filter, a second end, between which the screen assembly lies. Preferably the intake filter includes a cleaning unit including a brush support and a brush, with the brush support being releasably attached to the end seal and the core assembly with the brush extending the entire length of the filter screen, said brush includes bristles that extend from the brush support towards, and at least partially through, the filter screen.

In a preferred configuration the brush is longitudinally aligned to a longitudinal axis of the filter screen.

Preferably the core assembly includes a core tube that is a tube that lies inside the filter assembly when the filter assembly lies between the end seal and the screen stop, such that the core tube includes a first core section that is coterminous with the first end, a second core section that is coterminous with the second end and a central core section that lies between, and is coterminous with, the first and second core sections; where the central core section includes a plurality of core inlets that are apertures through the wall of the central core section that extend around the circumference and length of said central core section. Preferably the cross-sectional area of core inlets decreases along the length of central core section towards the screen stop.

Preferably the drive unit includes a drive unit output that is configured to engage and drive a drive band that extends circumferentially around the screen assembly. Preferably the drive band is a toothed belt or chain that has features which are configured to engage with complementary features on the drive unit output. In a highly preferred form the drive band is a chain or toothed belt, the drive unit output is a gear, sprocket or pulley and the filter screen includes teeth or wires that form a sprocket, ring gear or pulley around the screen assembly.

Preferably the screen assembly includes spacing means configured to concentrically space the core assembly and screen assembly apart.

Preferably the intake filter is intended to filter a fluid. In a more preferred form the fluid is a liquid. In a highly preferred form the intake filter is intended to filter water (salt or fresh).

Preferably the intake filter is intended to exclude solids greater than a predefined size.

BRIEF DESCRIPTION OF DRAWINGS

By way of example only, a preferred embodiment of the present invention is described in detail below with reference to the accompanying drawings, in which.

DEFINITIONS

Essentially: within +/−1% or less, for example 'essentially equispaced' means the spacing is within 1% of the same, for example if the spacing was 10 mm then 'essentially 10 mm' would be 10+/−0.1 mm;

Nominally: within +/−5%.

About: within +/−10%, for example 'about 20 mm' is 20+/−2 mm;

BEST MODE FOR CARRYING OUT THE INVENTION

Figures 1, 2:
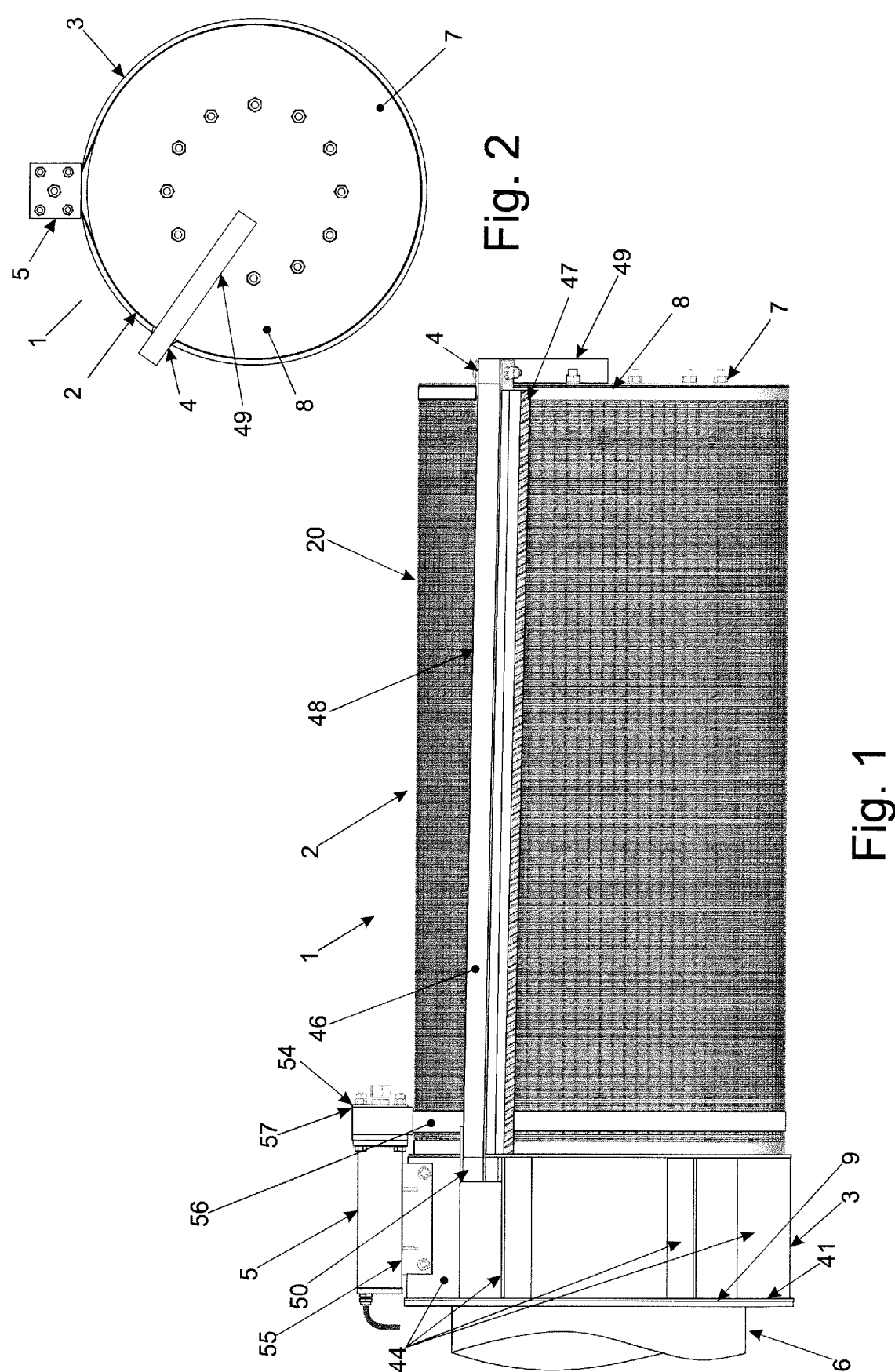
FIG. 1 is a side view of the intake filter attached to an inlet.
FIG. 2 is an end view of the intake filter shown in FIG. 1.

Referring to FIG. 1 and FIG. 2, an intake filter (1) including a screen assembly (2), a core assembly (3), cleaning unit (4) and drive unit (5) is shown attached to an intake (6).

The intake (6) is a conduit that accepts a fluid (normally a liquid) from the intake filter (1) for downstream use.

The intake filter (1) further includes an end seal (7) which is shown as a terminally located removable plate that, alone or in combination with additional components making up the end seal (7), acts to seal the exposed terminal end, the first end (8), of the intake filter (1). The opposite terminal end of the filter assembly (1), the second end (9), is adapted to be releasably or permanently be attached to the intake (6) by known means.

Figures 3, 4:
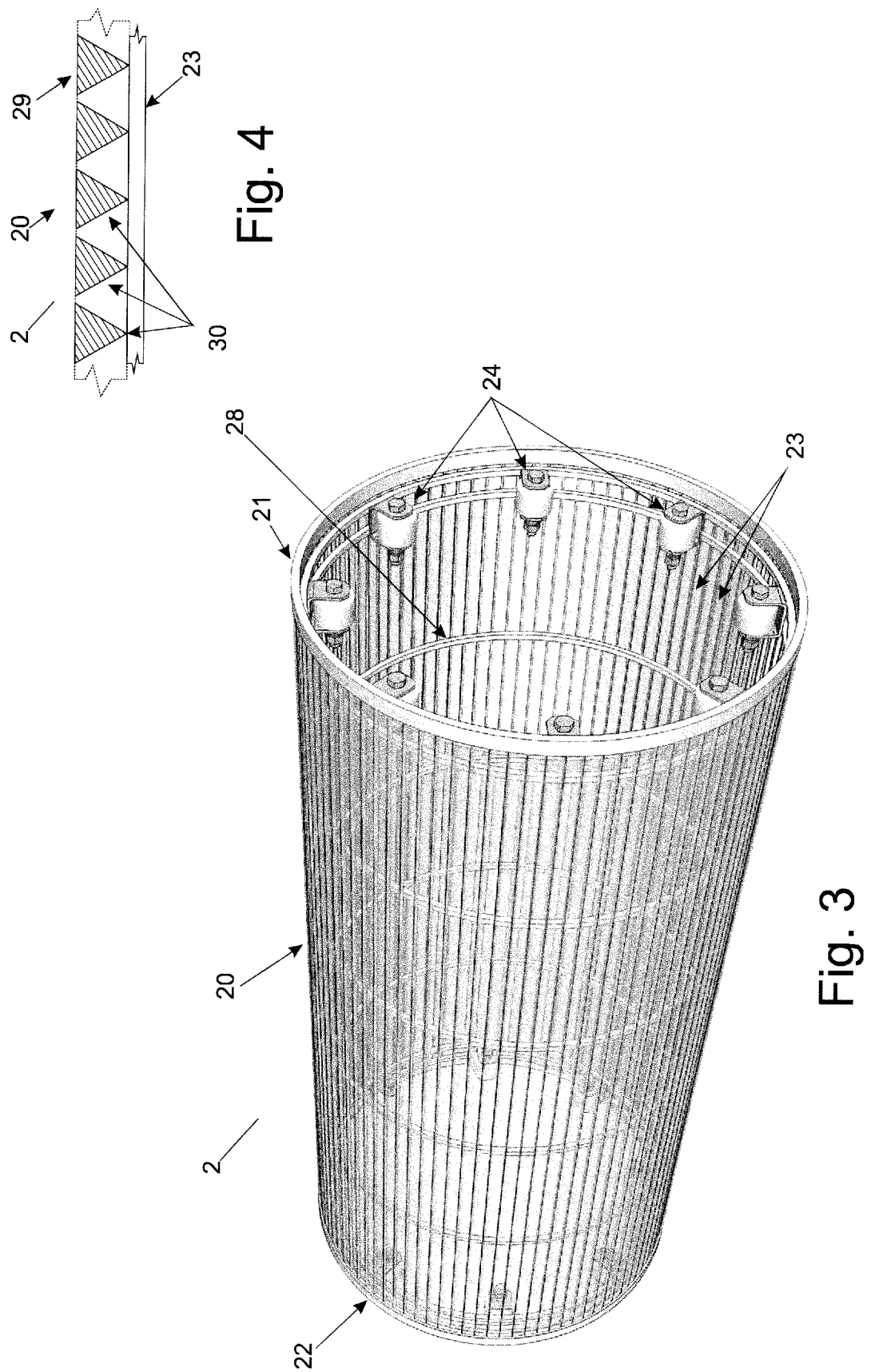
FIG. 3 a pictorial view of the screen assembly in isolation.
FIG. 4 is a cross sectional view of a portion of a wedge wire filter screen.

Referring to FIG. 3 the screen assembly (2) including a filter screen (20), end hoops (21,22), screen supports (23) and spacing means (24) is shown. The screen assembly (2) is a cylinder with two end hoops (21,22) that form the opposite terminal ends of the screen assembly (2).

The end hoops (21,22) are attached to, and spaced apart by, a plurality of circumferentially arranged screen supports (23). The screen supports (23) are shown as linear elongate strips aligned with the longitudinal axis of the screen assembly (2), however, in some configurations, they may follow a helical path. Each screen support (23) is permanently or releasably, but rigidly, attached to each of the end hoops (21,22).

The screen supports (23) act to support the filter screen (20), alone, or in combination with other elements of the screen assembly (2), in the configuration shown in FIG. 3 the screen assembly (2) further includes support hoops (28) that are trans-axially aligned hoops that engage with the inner-most surface of the screen supports (23). The support hoops (28) shown are nominally equispaced along the length of the screen assembly between the end hoops (21,22).

Each spacing means (24) is shown as a device including a roller extending radially from the internal wall of the screen assembly (2) towards the centre of the filter assembly (2). The spacing means (24) are equispaced about the circumference of the screen assembly (2) and terminate the same distance from the central axis.

Referring to FIG. 4 a portion of the filter screen (20) is shown, in this variant the filter screen (20) consists of a plurality of screen wires (30). In this case each screen wire (30) is a triangular cross section wire (commonly called 'wedge wire') with the base of each triangle forming a major portion of the outermost surface (29) of the screen assembly (2). Each screen wire (30) extends around the circumference of the screen assembly (2) forming a circumferential path or a helical path. The screen wire (30) is shown with a vertex in contact with a portion of a screen support (23). Where the screen wire (30) follows a helical path each screen wire (30) extends partially along the length of the filter screen (20). In an alternative variant there is a single screen wire (30) that extends helically along the entire length of the filter screen (20). The screen wire (30) will normally be rigidly attached to one or more screen supports (23), welding or gluing are two options to accomplish this.

Figure 5:
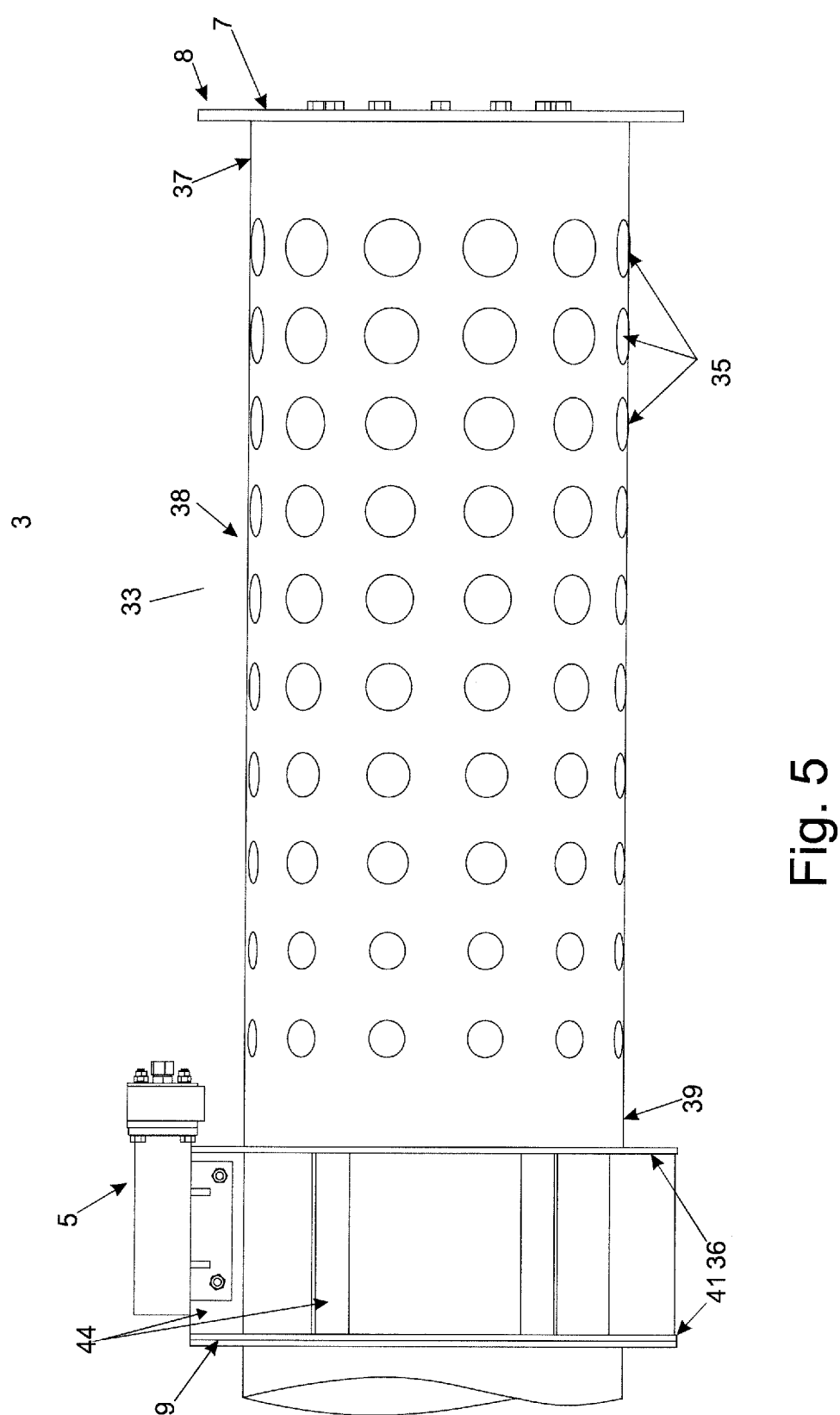
FIG. 5 is a side view of the core assembly of the intake filter attached to the end seal, with the screen assembly and drive band removed.
Figure 6:
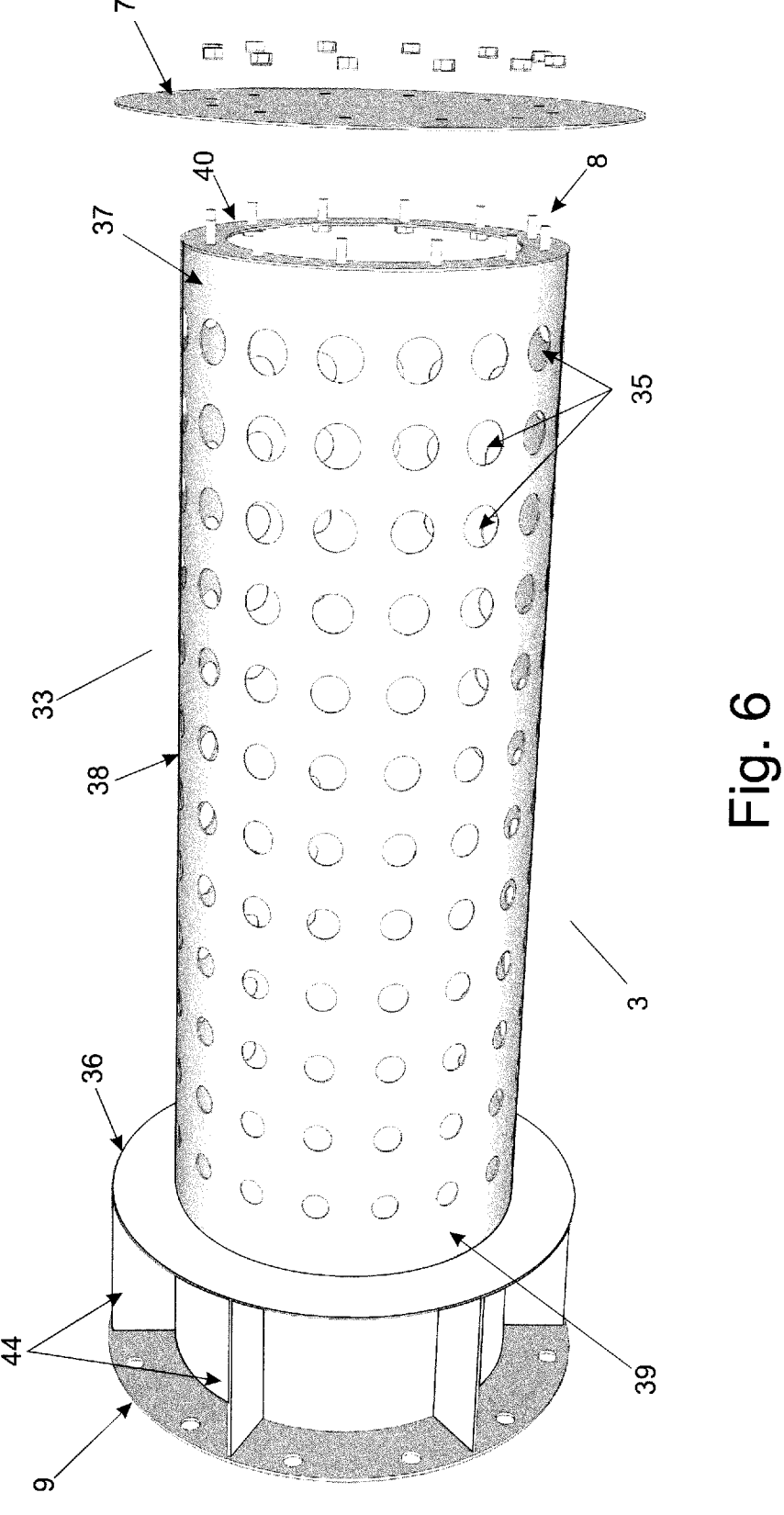
FIG. 6 is a pictorial view of the core assembly

Referring to FIG. 5 and FIG. 6 the core assembly (3) including a core tube (33), core inlets (35) and a screen stop (36), without the screen assembly (2) (see FIG. 1) in place, is shown.

In FIG. 5 the end seal (7) and drive unit (5) are shown attached to the core assembly (3), and in FIG. 6 the end seal (7) is shown separated from the end of the core assembly (3).

The core tube (33) is a tube that includes a first core section (37) a central core section (38) and a second core section (39). The first core section (37) co-terminates with the first end (8) and the second core section (39) co-terminates with the second end (9). The central core section (38) lies between the first and second core sections (37,39) and is coterminous with both.

The core inlets (35) are a plurality of apertures in the central core section (38) which vary in cross section along the length of the central core section (38). The varying cross sectional area of the core inlets (35) is intended to vary the fluid velocity through the core inlets (35) along the length of the central core section (38) to balance the flow through the filter screen (20) (see FIG. 1). The core inlets (35) shown have a decreasing cross-sectional area as you move from those adjacent the second core section (39) to those adjacent the first core section (37). Though shown as a plurality of circular apertures the cross-sectional shape of the core inlets (35) can be any acceptable shape, for example any regular or irregular polygon (stellated or not) with sharp or rounded vertices, ellipses or any combination of these. The core apertures (35) are shown extending the full length and circumference of the central core section (38).

The screen stop (36) is a flange located on the second core section (39) which is longitudinally separated from a portion of the end seal (7) by a length L1. The length of screen assembly (2) (see FIG. 1) is L2, and L2 is less than L1 by an amount that allows rotation of the screen assembly by the drive unit (5). The difference between L1 and L2 is chosen to minimise any fluid bypassing the filter screen (20). The exposed ends of the end hoops (21,22) may contact the screen stop (36) and end seal (7), that is L1=L2, in some configurations, this may require a lubricant or friction reducing material to be used. Alternatively, or in combination with a friction reducing material or lubricant, the exposed ends may be constructed of a low friction material.

Referring to FIG. 6 the first core section (37) further includes a core connector (40) which is a flat ring coterminous with the first end (8) that extends radially inwards from the outer surface of the first core section (37). This core connector (40) provides a flat surface for the end seal (7) to engage with. The end seal (7) is shown attached with a plurality of nuts and bolts, however any releasable fastening (including adhesives) mechanism can be used. An adhesive softened by heat or dissolved by a solvent could be used as can traditional mechanical fixing such as nuts and bolts (captive nuts or studs) or rivets or similar, in combination or alone.

Referring to FIG. 5, or FIG. 1, the core assembly (3) includes an intake flange (41) which is coterminous with the second end (9) of the of the intake filter (1). In the configuration shown the intake flange (9) and screen stop (36) are longitudinally spaced apart. Spaced around the circumference of the second core section (39), between the intake flange (9) and screen stop (36) are a plurality of core webs (44). Attached to one of these core webs (44) is the drive unit (5).

The drive unit (5) can be a motor, motor with gearbox, a motor with speed control or any other suitable motive source.

Figure 7:
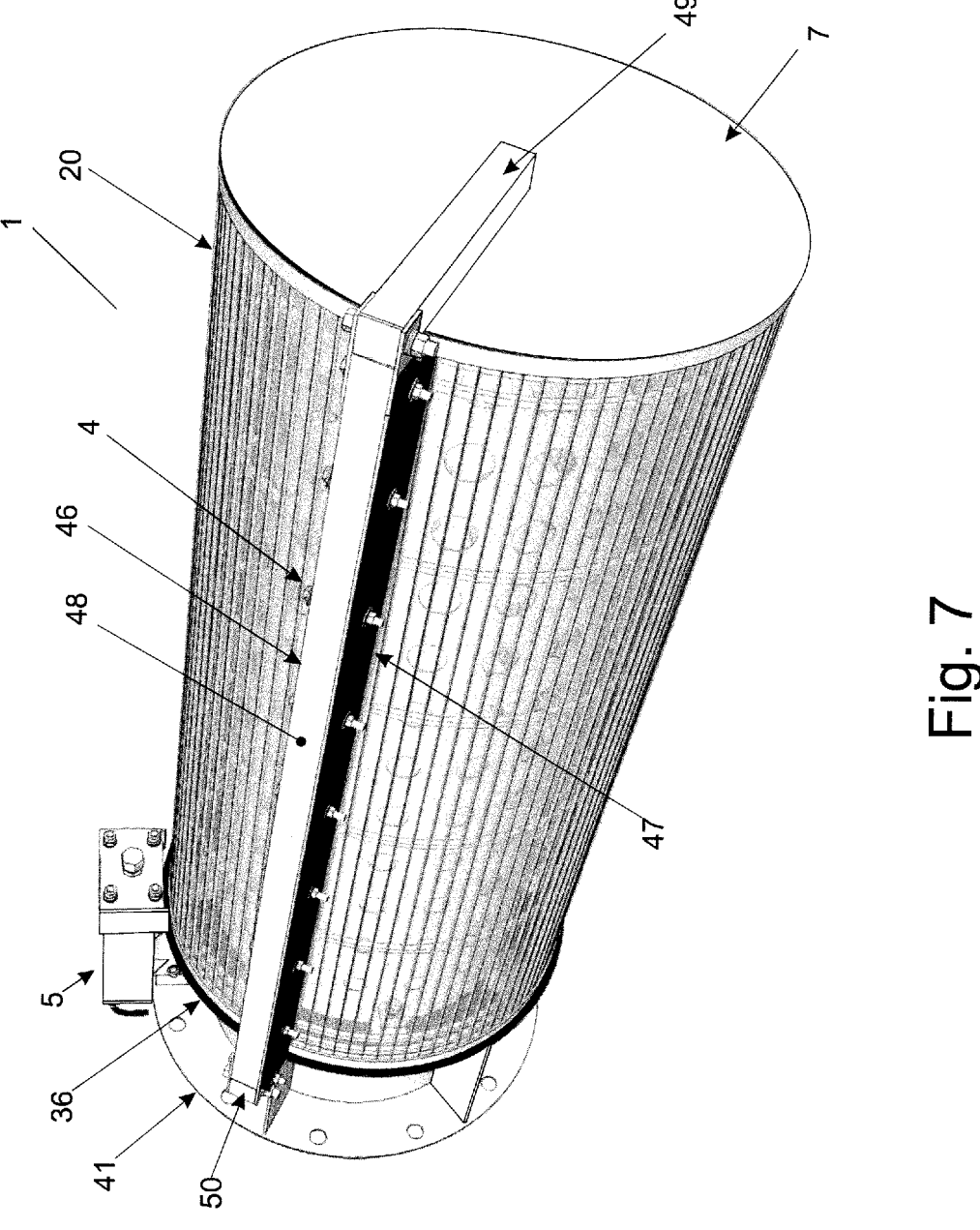
FIG. 7 is a pictorial view of the intake filter viewed from the end plate end.

Referring to FIG. 7, and where necessary FIGS. 1 and/or 2, the cleaning unit (4) including a brush support (46) and brush (47) is shown attached to the end seal (7) screen stop (36). The cleaning unit (4) can be releasably attached to the end seal (7) and any other portion of the core assembly (3) between the screen stop (36) and intake flange (41), including those items.

The brush support (46) includes a primary brush support element (48) and two secondary brush support elements (49,50), a first secondary brush support element (49) and second secondary brush support element (50).

In use the primary brush support element (48) extends lengthwise along the intake filter (1) over the filter screen (20), with the secondary brush support elements (49,50) extending from the primary support element (48) towards the core assembly (3) (see FIG. 5 for example). The secondary brush support elements (49,50) are the portions of the cleaning unit (4) that are attached to the end seal (7) and core assembly (3).

The brush (47) is releasably or permanently attached to the primary brush support element (49), extending from the primary brush support element (49) towards, and generally through, the filter screen (20).

The primary brush support element (48) is releasably, or in some cases permanently, attached to the brush (47).

The longitudinal axis of the brush (47) may be parallel to the longitudinal axis of the filter screen (20), or, as shown in FIG. 1 at a slight angle.

With drive unit (5) located externally, the brush support (46) is rigidly (releasably or permanently) attached to two terminally located fixed points, this is possible as the end seal (7) does not rotate with the filter screen (20). The brush support (46) is not cantilevered, thus:

(i) the brush support provides a higher strength to weight ratio than a cantilevered configuration;

(ii) the brush (47) can be positioned closer to the filter screen (20) and the bristles of the brush (47) can be forced deeper into the filter screen (20) to effect a more complete cleaning action than cantilevered configuration;

(iii) the bristles of the brush (47) are pushed more evenly into the filter screen (20) as opposed to a cantilevered configuration where the force on the bristles normally drops the further you are from the attachment point.

Figures 8, 9:
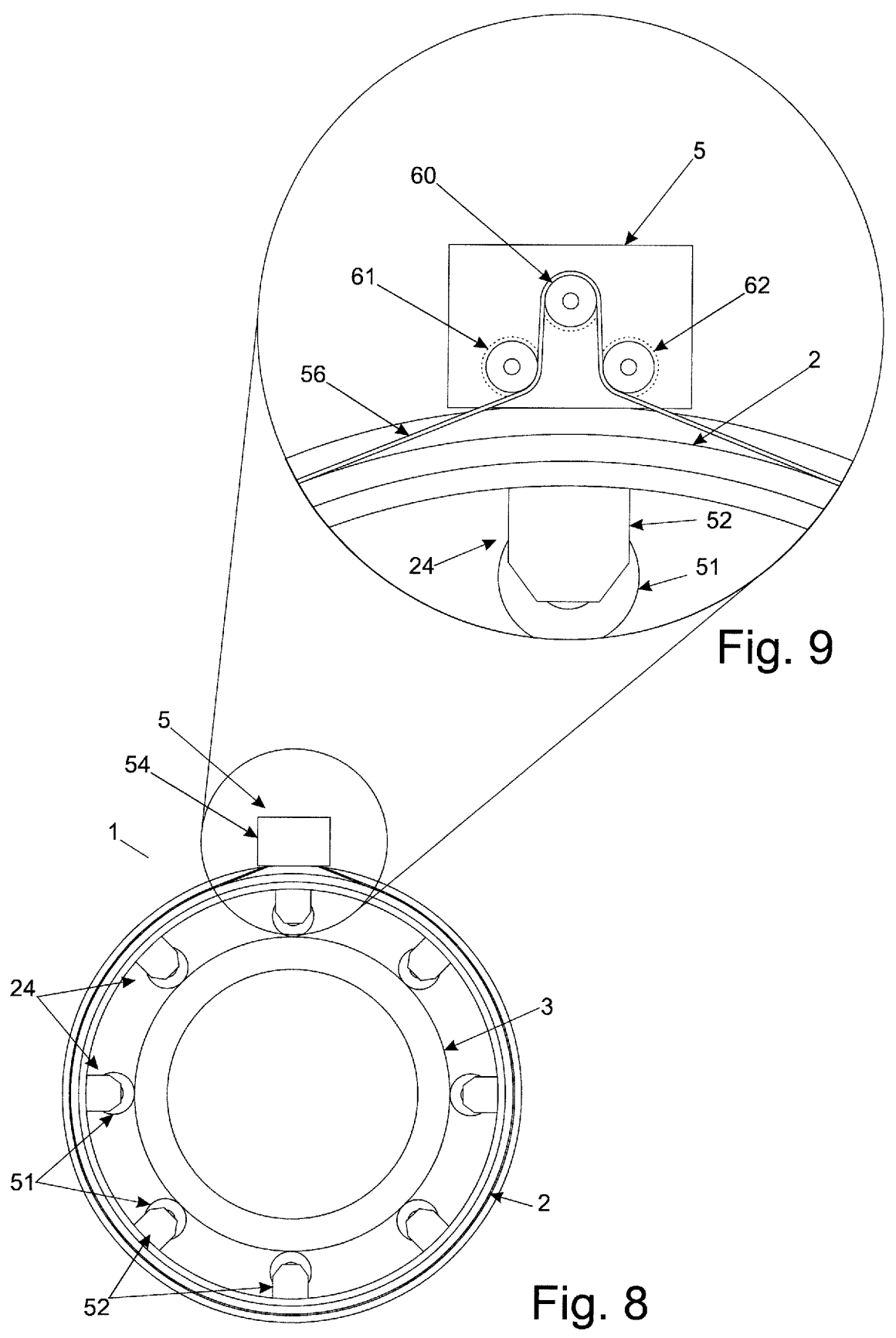
FIG. 8 is an end view of the intake filter view from the end plate end with the end plate removed.
FIG. 9 is an enlarged section of FIG. 6 showing the drive band engaged with the drive unit.

Referring to FIGS. 8 and 9 an end view of the intake filter (1) with the end seal (7) (see FIG. 5 for example) removed and an enlarged detail of the drive unit (5), respectively, are shown.

Referring to FIG. 8 the spacing means (24) are shown as including spacing rollers (51) rotationally attached to spacing brackets (52). The rotational axis of the spacing rollers (51) is parallel to the longitudinal axis of the core assembly (3) and screen assembly (2). The spacing means (24) ensure that the core assembly (3) and screen assembly (2) remain concentric whilst allowing the screen assembly (2) to rotate around the core assembly (3). The longitudinally aligned spacing rollers (51) assist with the assembly of the intake filter (1) as they maintain the spacing between the screen assembly (2) and core assembly (3) as the screen assembly (2) is moved along the length of the core assembly (3).

Referring to FIG. 1 and FIG. 8 the drive unit (5) including a drive unit end cover (54), drive mounting means (55) and drive band (56) is shown, with the drive unit (5) uppermost.

The drive unit end cover (54) is a cover plate for one end of the drive unit (5), the first drive end (57). The first drive end (57) is the end of the drive unit (5) closest to the first end (8).

The drive mounting means (55) is shown as a bracket that is bolted to one of the core webs (44), any form of releasable, but normally rigid, attachment can be used.

Referring to FIG. 9 an enlarged end view of a section of FIG. 8 showing the end of the drive unit (5) with the drive unit end cover removed (54).

In FIG. 9 the drive unit (5) including a drive unit output (60) and two drive idlers (61,62) are shown engaged with a drive band (56) that passes around and engages with the screen assembly (2).

The drive band (2) can be a chain, a toothed belt, a notched belt or anything similar that does not depend purely on friction to transfer rotational motion and torque from the drive unit output (60) to the screen assembly (2). Where the drive band (56) is a chain or toothed band then the portion of the screen assembly (2) that the drive band engages with may have features that positively engage with the drive band (56). For example, these features can be a series of teeth or wire directly attached to the outer surface of the screen assembly (2) that form a sprocket, pulley, or part of a ring gear that surrounds the screen assembly (2).

The drive unit output (60) and drive idlers (61,62) are arranged as a triangle with the drive unit output (60) as the uppermost vertex and the drive idlers (61,62) forming a flat base. The drive band (56) passes around one drive idler (61,62), an alpha drive idler (61), around the drive unit output (60) then the other drive idler (61,62), the beta drive idler (62). By using this configuration, the arc of contact of the drive band (56) with the drive unit output (60) is maximised. As an added advantage the drive idlers (61,62) can be used to tension the drive band (56) should any stretching occur.

In the preferred configuration, the drive unit output (60) includes a sprocket or pulley that engages with the drive band (56), shown as a dashed line, and the drive idlers (61,62) may also include similar features.

The drive unit (5) can include a gearbox, or be driven by a variable speed drive, to optimise the rotational velocity of the screen assembly (2) for different applications.

By driving the screen assembly (2) from the outside, rather than the inside a much smaller drive unit (5) combined with the drive band (56) can be used to convert the low torque from the small external drive unit (5) to high torque on the screen assembly (2). In addition, the drive unit (5), now positioned outside the screen assembly (2), can be easily accessed for servicing/maintenance without removing the screen assembly (2). For example, the drive unit (5) can be removed and replaced if needed, for example by divers, without the need for removing the intake filter (1) from the fluid.

The external location of the drive unit (5) further allows for a small pulley or sprocket to provide gear reduction (and corresponding torque increase) to a much larger screen assembly (2). The outside of the screen assembly (2) essentially becomes a large pulley or sprocket. In current configurations the drive band (56) has been used to increases the torque available to turn the filter drum by a factor of 15 to 30 times the torque output from the external drive unit. This allows for a much smaller drive unit compared with centrally driven drive systems.

In some configurations the support hoops (28) may not be present. In these configurations the screen supports (23) are shaped and dimensioned to support the screen wires (30) alone.

In some configurations the support hoops (28) are not equispaced along the length of the screen assembly (20).

Referring to FIG. 3 the filter screen (20) can consist of screen wires (30) that are not triangular in cross section.

In a further configuration (not shown) each screen support (23) includes an indentation, for example a notch, dimensioned to accept a portion of a screen wire (30). In this configuration the terminal ends of the screen wire (30) may be the only portions of that screen wire (23) to be rigidly attached to a screen support (23) or an end hoop (21,22). In this configuration the screen wire (30) is tensioned to remain in the complementary indentations. This configuration would allow a damaged or worn screen wire (30) to be replaced more quickly than one attached to each screen support (23) it engages with.

In some configurations (not shown) at least one core inlet (35) extends the full length of the central core section (38).

In some configurations the end seal (7) and core connector (40) include features that allow the end seal (7) to rotate to engage and disengage with each other. For example, this could involve keys in keyways, threaded sections, bayonet connectors or similar.

In some configurations the spacing means (24) are attached to the first and second core sections (37,39) which may require a running surface to be incorporated into the filter screen (20).

Though spacing means are described as rollers, they can be any suitable device

In some configurations (not shown) the drive unit (5) directly engages with complementary teeth attached to the screen assembly (2) that form a sprocket, pulley or a ring gear that surrounds the screen assembly (2).

KEY

1. Intake filter
2. Screen assembly
3. Core assembly;
4. Cleaning unit;

5. Drive unit;
6. Intake;
7. End seal;
8. first end;
9. second end;
20. Filter screen;
21. First end hoop;
22. Second end hoop;
23. Screen supports;
24. Spacing means (wheels/magnets/rollers/balls/castors/ etc.) that space the core from the screen but allow the filter screen to rotate around the core tube.)
28. Support hoops;
29. Outermost surface of the filter screen;
30. Screen wire;
33. Core tube;
35. Core inlets;
36. Screen Stop;
37. First core section;
38. Central core section;
39. Second core section;
40. Core connector;
41. intake flange;
44. core web;
46. brush support;
47. brush;
48. primary brush support element;
49. first secondary brush support element;
50. second secondary brush support element;
51. Spacing rollers;
52. Spacing brackets;
54. Drive unit end cover;
55. Drive mounting means;
56. Drive band;
57. First drive end;
60. Drive unit output;
61. Drive idler;
62. Drive idler;

The invention claimed is:

1. An intake filter including a cylindrical screen assembly, a core assembly and a drive unit; where the drive unit is attached to the intake filter and configured to rotate the screen assembly about a longitudinal axis of said screen assembly, wherein the core assembly is configured to be attached to an intake, such that the drive unit lies entirely outside a volume of the screen assembly and a portion of the core assembly lies within the volume of the screen assembly;

wherein, the intake filter comprises a removable non-rotating end seal releasably attached to one terminal end of the intake filter, a first end, and a screen stop located adjacent an opposite terminal end of the intake filter, a second end, between which the screen assembly lies;

such that the core assembly comprises a core tube that is a tube that lies inside the filter assembly when the filter assembly lies between the end seal and the screen stop, such that the core tube comprises a first core section that is co-terminous with the first end, a second core section that is co-terminous with the second end and a central core section that lies between, and is co-terminous with, the first and second core sections; and wherein the central core section comprises a plurality of core inlets that are apertures through the wall of the central core section that extend around the circumference and length of said central core section; and

the cross-sectional area of core inlets decreases along the length of central core section towards the screen stop.

2. The intake filter as claimed in claim 1 wherein, the screen assembly includes a filter screen including at least one wire that extends circumferentially about the filter screen.

3. The intake filter as claimed in claim 1, wherein, at least one of the at least one wire is a wedge wire.

4. The intake filter as claimed in claim 1, wherein, there are a plurality of wires that extend circumferentially about the filter screen.

5. The intake filter as claimed in claim 1, wherein, at least one of the at least one wire follows a helical path.

6. The intake filter as claimed in claim 3, wherein, at least one of the at least one wire follows a helical path.

7. The intake filter as claimed in claim 1, wherein, at least one of the at least one wire extends helically the entire length of the filter screen.

8. The intake filter as claimed in claim 1, wherein, the intake filter includes a removable non-rotating end seal releasably attached to one terminal end of the intake filter, a first end, and a screen stop located adjacent the opposite terminal end of the intake filter, a second end, between which the screen assembly lies.

9. The intake filter as claimed in claim 7, wherein, the intake filter includes a removable non-rotating end seal releasably attached to one terminal end of the intake filter, a first end, and a screen stop located adjacent the opposite terminal end of the intake filter, a second end, between which the screen assembly lies.

10. The intake filter as claimed in claim 1, wherein, the intake filter includes a cleaning unit including a brush support and a brush, with the brush support being releasably attached to an end seal and the core assembly with the brush extending the entire length of the filter screen, said brush includes bristles that extend from the brush support towards, and at least partially through, the filter screen.

11. The intake filter as claimed in claim 9, wherein, the intake filter includes a cleaning unit including a brush support and a brush, with the brush support being releasably attached to the end seal and the core assembly with the brush extending the entire length of the filter screen, said brush includes bristles that extend from the brush support towards, and at least partially through, the filter screen.

12. The intake filter as claimed in claim 10, wherein, the brush is longitudinally aligned to a longitudinal axis of the filter screen.

13. The intake filter as claimed in claim 11, wherein, the brush is longitudinally aligned to a longitudinal axis of the filter screen.

14. The intake filter as claimed in claim 13, wherein, the core assembly includes a core tube that is a tube that lies inside the screen assembly when the screen assembly lies between the end seal and the screen stop, such that the core tube includes a first core section that is coterminous with the first end, a second core section that is coterminous with the second end and a central core section that lies between, and is coterminous with, the first and second core sections; where the central core section includes a plurality of core inlets that are apertures through the wall of the central core section that extend around the circumference and length of said central core section.

15. The intake filter as claimed in claim 14, wherein, a cross-sectional area of core inlets decreases along the length of central core section towards the screen stop.

16. The intake filter as claimed in claim 1 wherein, the drive unit includes a drive unit output that is configured to engage and drive a drive band that extends circumferentially around the screen assembly.

17. The intake filter as claimed in claim 1 wherein, the drive unit includes a drive unit output that is configured to engage and drive a drive band that extends circumferentially around the screen assembly.

18. The intake filter as claimed in claim 17, wherein, the drive band is a toothed belt.

19. The intake filter as claimed in claim 17, wherein, the drive band is a chain that has features which are configured to engage with complementary features on the drive unit output.

20. The intake filter as claimed in claim 17, wherein, the drive band is a chain or toothed belt, the drive unit output is a gear, pulley or sprocket and the filter screen includes teeth or wires that form a sprocket or ring gear around the screen assembly.

21. The intake filter as claimed in claim 1, wherein, the screen assembly includes a spacing means configured to concentrically space the core assembly and screen assembly apart.

22. The intake filter as claimed in claim 15, wherein, the screen assembly includes a spacing means configured to concentrically space the core assembly and screen assembly apart.

23. The intake filter as claimed in claim 21, wherein, the spacing means are a plurality of longitudinally aligned rollers attached to the screen assembly by brackets.

24. The intake filter claimed in claim 1, wherein, the intake filter is configured to filter a liquid.

25. The intake filter claimed in claim 15, wherein, the intake filter is configured to filter a liquid.

* * * * *